(12) United States Patent
Park

(10) Patent No.: US 7,884,896 B2
(45) Date of Patent: Feb. 8, 2011

(54) DISPLAY APPARATUS AND BACKLIGHT ASSEMBLY HAVING A LIGHT GUIDE PLATE COMPRISING FIRST AND SECOND LIGHT CONTROL PATTERNS

(75) Inventor: Sang-Jun Park, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 119 days.

(21) Appl. No.: 12/105,052

(22) Filed: Apr. 17, 2008

(65) Prior Publication Data

US 2008/0278659 A1   Nov. 13, 2008

(30) Foreign Application Priority Data

May 8, 2007   (KR)   ........................ 10-2007-0044632

(51) Int. Cl.
G02F 1/1335   (2006.01)
F21V 7/04   (2006.01)
(52) U.S. Cl. .......................................... 349/65; 362/621
(58) Field of Classification Search ............. 349/61–64; 362/621–622
See application file for complete search history.

(56) References Cited

U.S. PATENT DOCUMENTS

2002/0054488 A1* 5/2002 Ohkawa .................... 362/31
2004/0109664 A1* 6/2004 Ohtsuki et al. ............ 385/146
2006/0164863 A1* 7/2006 Chang et al. ............... 362/621
2006/0238367 A1* 10/2006 Tsuchiya ................... 340/815.4
2007/0121342 A1* 5/2007 Tamura et al. ............. 362/608

FOREIGN PATENT DOCUMENTS

| JP | 2004-055396 | 2/2004 |
| KR | 1020040063384 | 7/2004 |
| KR | 1020040074927 | 8/2004 |
| KR | 1020060061257 | 6/2006 |

OTHER PUBLICATIONS

English Abstract Publication No. 2004-055396.
English Abstract Publication No. 1020040063384.
English Abstract Publication No. 1020040074927.
English Abstract Publication No. 1020060061257.

* cited by examiner

*Primary Examiner*—Mark A Robinson
*Assistant Examiner*—Paul C Lee
(74) *Attorney, Agent, or Firm*—F. Chau & Associates, LLC

(57) ABSTRACT

A light-guide plate includes an incident surface, a emissive surface and a reflective surface. The incident surface includes a plurality of light-control patterns formed in sectioned regions of the incident surface. The light-control patterns have shapes different from one another according to the regions corresponding to a position of a light source. The emissive surface is extended from a side of the incident surface. The reflective surface is opposite to the emissive surface.

22 Claims, 8 Drawing Sheets

DISPLAY APPARATUS AND BACKLIGHT ASSEMBLY HAVING A LIGHT GUIDE PLATE COMPRISING FIRST AND SECOND LIGHT CONTROL PATTERNS

CROSS-REFERENCE TO RELATED APPLICATIONS

This application claims priority under 35 U.S.C. §119 to Korean Patent Application No. 2007-44632, filed on May 8, 2007 in the Korean Intellectual Property Office (KIPO), the contents of which are herein incorporated by reference in their entirety.

BACKGROUND OF THE INVENTION

1. Field of the Invention

The present disclosure is directed to a light-guide plate, a backlight assembly and a display apparatus having the light-guide plate. More particularly, the present disclosure is directed to a light-guide plate for guiding light generated from a light source, a backlight assembly and a display apparatus having the light-guide plate.

2. Description of the Related Art

A liquid crystal display (LCD) apparatus generally includes an LCD panel and a backlight assembly for providing the LCD panel with light.

The backlight assembly includes a light source to generate light. Various light-emitting units may serve as the light source. The backlight assembly includes light-emitting diodes (LEDs) when the LCD apparatus is a small-sized electronic device, such as a mobile communication terminal, a digital camera, a multimedia player, etc.

The backlight assembly generally further includes a light-guide plate disposed adjacent to the LEDs when the backlight assembly includes the LEDs as the light source. The light-guide plate guides the light generated from the LEDs to be emitted through an emissive surface of the light-guide plate. The backlight assembly may include a plurality of LEDs when the light-guide plate is large.

Recently, a method for reducing the number of the LEDs and the size of a dark region in the light-guide plate from which the light is not emitted has been developed to reduce the size and the thickness of products and manufacturing costs.

However, a distance between the LEDs increases as the number of the LEDs employed in the backlight assembly decreases. Therefore, the size of the dark region formed between the LEDs may be increased and brightness may be lowered.

SUMMARY OF THE INVENTION

Embodiments of the present invention provide a light-guide plate capable of reducing an area of the dark region and improving the efficiency of light generated from a light source.

Embodiments of the present invention further provide a backlight assembly having the light-guide plate.

Embodiments of the present invention still further provide a display apparatus having the backlight assembly.

A light-guide plate according to an exemplary embodiment of the present invention includes an incident surface, an emissive surface and a reflective surface. The incident surface includes a plurality of light-control patterns. The light-control patterns are formed in regions of the incident surface. The light-control patterns have shapes different from one another according to the regions corresponding to a position of a light source. The emissive surface is extended from a side of the incident surface. The reflective surface is opposite to the emissive surface.

The light-control patterns may include first control patterns and second control patterns. The first control patterns are formed in a first region of the regions corresponding to a central portion of the light source. The second control patterns are formed in a second region adjacent to both sides of the first region. Light passing through the first control patterns has a first beam angle and light passing through the second control patterns has a second beam angle larger than the first beam angle.

Each of the first control patterns may have a triangular cross-section. A pitch of each of the first control patterns may increase as a distance from a portion of the incident surface corresponding to a central portion of the light source increases. In another exemplary embodiment of the present invention, a height of each of the first control patterns may decrease as a distance from a portion of the incident surface corresponding to a central portion of the light source increases. Alternatively, the first control patterns may have the shape of a pyramid.

The second control patterns may have an oval-shaped cross-section. A pitch of each of the second control patterns may increase as a distance from a portion of the incident surface corresponding to a central portion of the light source increases. In another exemplary embodiment of the present invention, a height of each of the second control patterns may decrease as a distance from the first region increases.

In another exemplary embodiment of the present invention, the light-control patterns may include protruding patterns to increase a beam angle of light passing through the incident surface as a distance from a portion of the incident surface corresponding to a central portion of the light source increases. The protruding patterns may have an oval-shaped cross-section. An angle between a major axis of the oval and the incident surface may decrease as the portion of the incident surface corresponding to the central portion of the light source increases.

The light-control patterns may include convex patterns protruding from the incident surface. Alternatively, the incident surface may include an edge portion and a surface portion surrounded by the edge portion and the surface portion is recessed with respect to the edge portion. The light-control patterns protrude from the surface portion. In another exemplary embodiment of the present invention, the light-control patterns may include concave patterns that are recessed with respect to the incident surface.

The reflective surface may include reflective patterns to scatter light from the light source. The reflective patterns are formed in a first region of the reflective surface spaced apart from the incident surface and a density of the reflective patterns increases as a distance from the incident surface increases. The reflective surface may further include sub-reflective patterns formed in a second region of the reflective surface. The second region is disposed between both side portions of the incident surface and the first region.

A backlight assembly according to another exemplary embodiment of the present invention includes a light source, a light-guide plate and an optical sheet. The light source generates light. The light-guide plate includes an incident surface, an emissive surface and a reflective surface. The incident surface includes a plurality of light-control patterns. The light-control patterns are formed in regions of the incident surface sectioned according to a position of a light source. The light-control patterns have shapes different from one another according to the regions. The emissive surface is extended from a side of the incident surface. The reflective surface is opposite to the emissive surface. The optical sheet is disposed on the emissive surface. The light source may include at least two light-emitting diodes (LEDs).

A display apparatus according to further another exemplary embodiment of the present invention includes a backlight assembly and a display panel. The backlight assembly includes a light source, a light-guide plate and an optical sheet. The light-guide plate includes an incident surface, an emissive surface and a reflective surface. The incident surface includes a plurality of light-control patterns. The light-control patterns are formed in regions of the incident surface sectioned according to a position of a light source. The light-control patterns have shapes different from one another according to the regions. The emissive surface is extended from a side of the incident surface. The reflective surface is opposite to the emissive surface. The optical sheet is disposed on the emissive surface. The display panel is disposed on the optical sheet and displays an image.

According to the light-guide plate, light-control patterns are formed in regions of the incident surface sectioned according to a position of a light source and have shapes different from one another according to the regions. Therefore, in a backlight assembly having the light-guide plate and a display apparatus having the backlight assembly, a dark region formed between LEDs and a side portion of the light-guide plate may be substantially prevented and the efficiency of light may be improved.

BRIEF DESCRIPTION OF THE DRAWINGS

The above and other features of embodiments of the present invention will become more apparent by describing in detailed exemplary embodiments thereof with reference to the accompanying drawings.

DETAILED DESCRIPTION OF EXEMPLARY EMBODIMENTS

Embodiments of the invention are described more fully hereinafter with reference to the accompanying drawings, in which embodiments of the invention are shown. Embodiments of this invention may, however, be embodied in many different forms and should not be construed as limited to the embodiments set forth herein. It will be understood that when an element or layer is referred to as being "on," "connected to" or "coupled to" another element or layer, it can be directly on, connected or coupled to the other element or layer or intervening elements or layers may be present. Like numbers refer to like elements throughout.

Hereinafter, embodiments of the present invention will be explained in detail with reference to the accompanying drawings.

Figure 1:
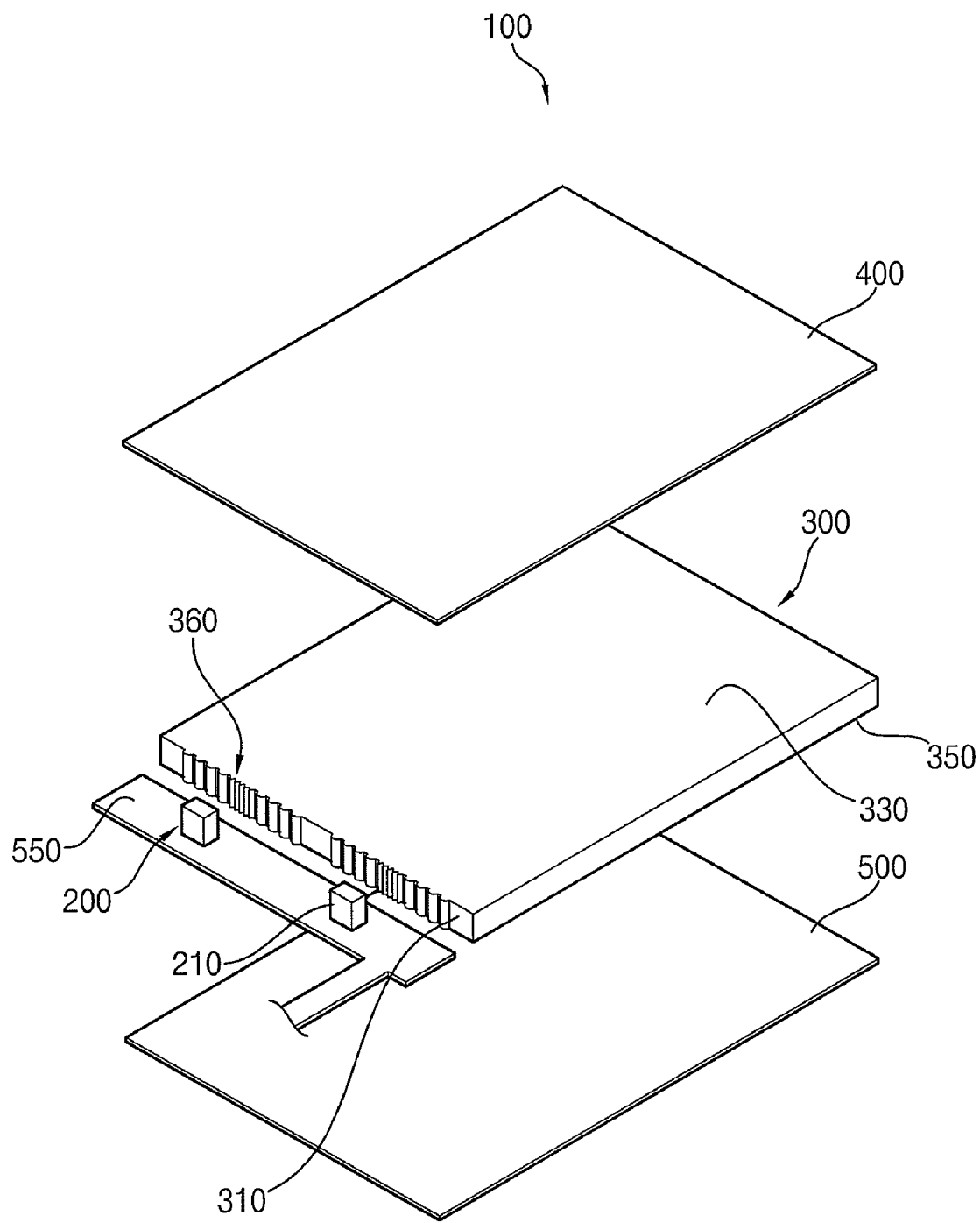
FIG. 1 is an exploded perspective view illustrating a backlight assembly according to an exemplary embodiment of the present invention.
Figure 2:
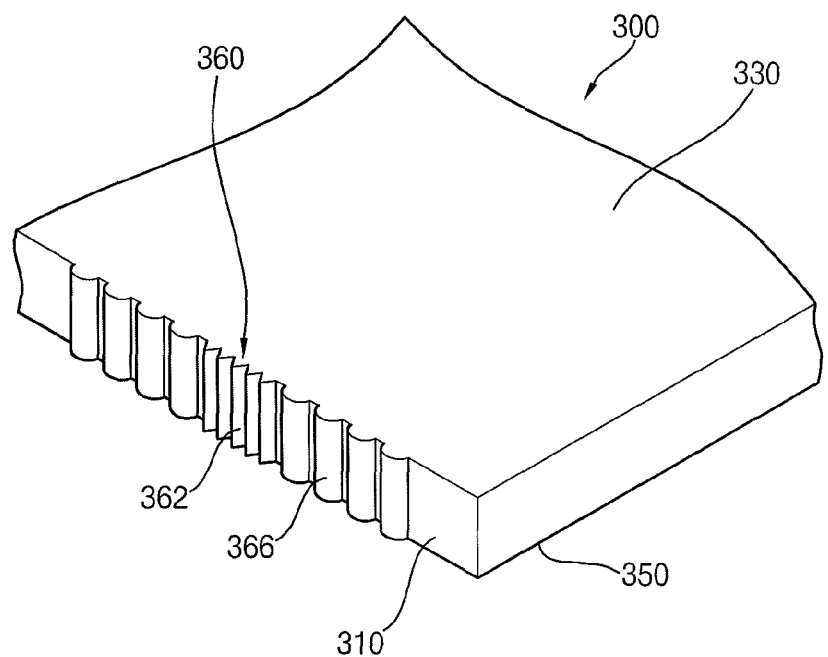
FIG. 2 is a perspective view illustrating an exemplary embodiment of the light-guide plate shown in FIG. 1.
Figure 3:
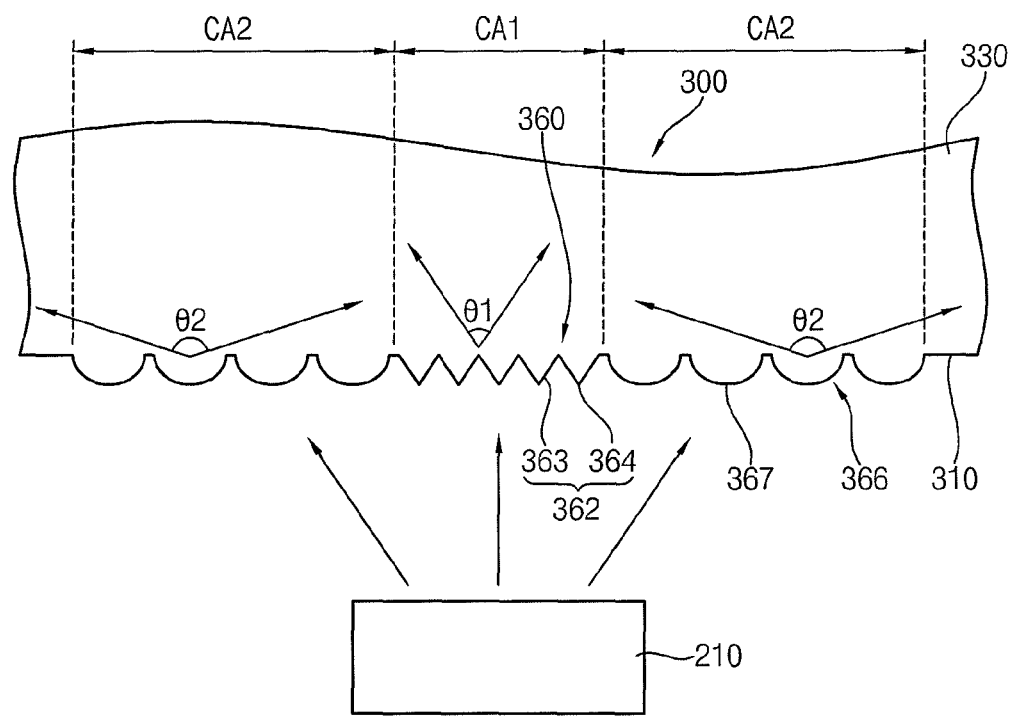
FIG. 3 is an enlarged plan view illustrating an exemplary embodiment of the light-control pattern unit shown in FIG. 2.

FIG. 1 is an exploded perspective view illustrating a backlight assembly according to an exemplary embodiment of the present invention. FIG. 2 is a perspective view illustrating an exemplary embodiment of the light-guide plate shown in FIG. 1. FIG. 3 is an enlarged plan view illustrating an exemplary embodiment of a light-control pattern unit shown in FIG. 2.

Referring to FIGS. 1 to 3, a backlight assembly 100 according to an exemplary embodiment of the present invention includes a light source 200 and a light-guide plate 300.

The light source 200 includes a light-emitting diode (LED) 210. The LED 210 receives power from an exterior power supply to generate light using semiconductor properties. The LED 210 generates point light. Rays of the point light have directional properties. The rays of the point light spread out from the LED 210.

The light-guide plate 300 includes an incident surface 310, an emissive surface 330 and a reflective surface 350. The emissive surface 330 is substantially perpendicularly extended from a first edge of the incident surface 310. The reflective surface 350 is substantially perpendicularly extended from a second edge of the incident surface 310 opposite to the first edge. The LED 210 is disposed adjacent to the incident surface 310. The light source 200 may include a plurality of LEDs 210. The LEDs 210 may be disposed adjacent to the incident surface 310 when the light source 200 includes a plurality of LEDs 210. The LEDs 210 are arranged in a line.

A light-control pattern unit 360 is formed at the incident surface 310. The light-control pattern unit 360 controls the light generated from the LED 210 to spread out in predetermined angles different from one another according to regions of the incident surface 310. The regions of the incident surface 310, in which the light-control pattern unit 360 is formed, correspond to a position of the LED 210. Alternatively, a plurality of light-control pattern units 360 may be formed at the incident surface 310 when the backlight assembly 100 includes a plurality of LEDs 210 respectively corresponding to the light-control pattern units 360.

The light-control pattern units 360 may include control patterns respectively formed at the regions of the incident surface 310 with respect to the position of the LED 210. The control patterns may have shapes different from one another. Rays of light passing through one of the control patterns spread out so that an exterior ray of the light has a path inclined by a predetermined angle with respect to a normal line of the incident surface 310. Hereinafter, the angle between the path of the exterior ray and the normal line of the incident surface 310 is referred to as a beam angle.

The light-control pattern unit 360 diffuses light at a narrow angle or a wide angle. The light-control pattern unit 360 may include an embossed pattern protruding from the incident surface 310.

Referring now to FIGS. 2 and 3, the light-control pattern unit 360 may include a first control pattern 362 and a second control pattern 366. The first control pattern 362 is formed at a first region CA1 corresponding to a central portion of the LED 210. The first region CA1 may be adjacent to the LED 210.

Light incident into the second control pattern 366 is inclined with respect to the incident surface 310. The second control pattern 366 is formed in a second region CA2. The second region CA2 is disposed at a side of the first region CA1. For example, two second regions CA2 may be disposed at opposite sides of the first region CA1.

A portion of the light generated from the LED 210 is substantially perpendicularly incident into the first region CA1 with respect to the incident surface 310 and another portion of the light is slantingly incident into the second region CA2 with respect to the incident surface 310. A boundary between the first region CA1 and the second region CA2 may be variable according to the size of the LED, optical properties of the LED, electrical properties of the LED, etc.

For example, the first region CA1 may have an area corresponding to two-thirds of an area of a surface of the LED when light generated from the LED is emitted from the surface of the LED. The second region CA2 may have an area larger than the area of the first region CA1 by about one time to about two times.

Light passing through the first control pattern 362 has a first beam angle θ1. Light passing through the second control pattern 366 has a second beam angle θ2 larger than the first beam angle θ1. Thus, the second control pattern 366 diffuses light to increase an amount of light emitted from a portion of the emissive surface 330 near the incident surface 310. The first control pattern 362 and the second control pattern 366 may be formed by a mold for manufacturing the light-guide plate 300. The light-guide plate 300 guides light incident into the incident surface 310 so that the guided light is emitted from the emissive surface 330.

The emissive surface 330 is extended from the edge of the incident surface 310. For example, the emissive surface 330 may be an upper surface of the light-guide plate 300. The light incident into the first control pattern 362 of the incident surface 310 includes rays spread out in the first beam angle θ1 and guided by the light-guide plate 300. Thus, a length of the path of the light incident into the first control pattern 362 may decrease before the light is emitted from the emissive surface 330. Accordingly, loss of the light may decrease so that the efficiency of the light may be improved.

The reflective surface 350 corresponds to a lower surface of the light-guide plate 300. The reflecting surface 350 reflects the light incident into the incident surface 310 toward the emissive surface 330.

As mentioned above, the light-guide plate 300 changes the point light generated from the LED into planar light and emits the planar light.

Referring back to FIG. 1, the backlight assembly 100 may further include an optical sheet 400, a reflective sheet 500 and a light source driving film 550. The optical sheet 400 is disposed on the emissive surface 330. The reflective sheet 500 is disposed under the reflective surface 500. The light source driving film 550 is disposed adjacent to the LED 210 and applies a driving power to the LED 210.

The optical sheet 400 improves the brightness of light emitted from the emissive surface 330. For example, the optical sheet 400 includes a light-concentrating sheet and a light-diffusing sheet. The light-concentrating sheet concentrates light emitted from the emissive surface 330 to improve front brightness. The light-diffusing sheet diffuses the light to improve the uniformity of the brightness. The reflective sheet reflects light leaking from the reflective surface 350 to improve the efficiency of the light.

The light source driving film 550 makes contact with a portion of the reflective surface 350 and a surface of the LED 210. The light source driving film 550 helps prevent light from leaking when the light-guide plate is misaligned with the LEDs 210.

In addition, the light-guide plate 300 may further include an extension portion (not shown) extended to be disposed between the LEDs 210. The extension portion increases an area, in which the light source driving film 550 makes contact with the LEDs 210. Thus, the extension portion reinforces adhesion between the light source driving film 550 and the LEDs 210 and prevents the light from leaking.

Figure 4:
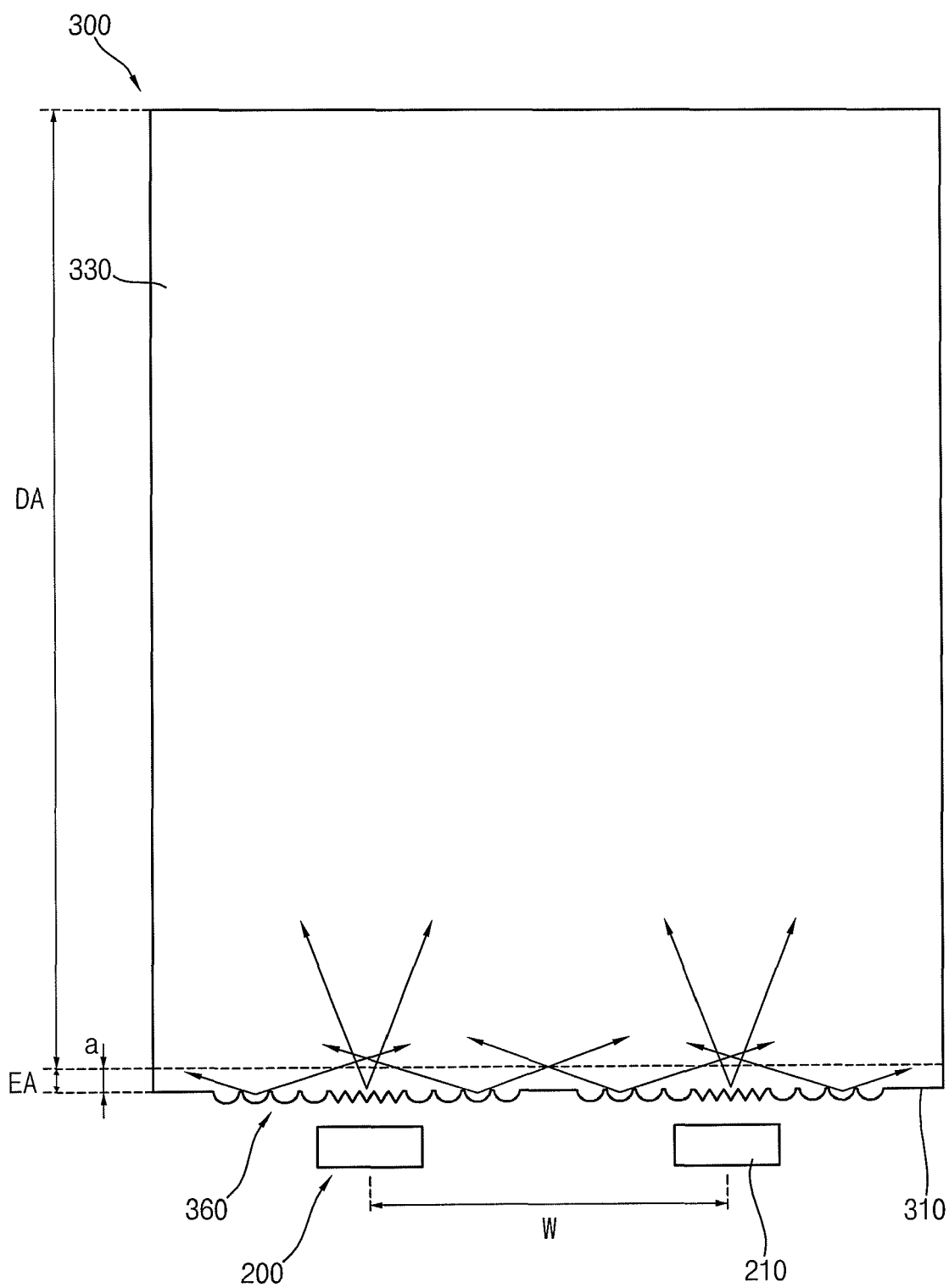
FIG. 4 is a plan view illustrating the light-guide plate and light-emitting diodes (LEDs) shown in FIG. 1.

FIG. 4 is a plan view illustrating the light-guide plate and LEDs shown in FIG. 1.

Referring to FIG. 1, FIG. 3 and FIG. 4, an exemplary arrangement of two LEDs 210 are spaced apart from each other and disposed adjacent to the incident surface 310 of the light-guide plate 300.

Light-control pattern units 360 respectively corresponding to the two LEDs 210 are formed at the incident surface 310. Each of the light-control pattern units 360 includes a first control pattern 362 and a second control pattern 366.

When the number of the LEDs 210 per unit area of light-guide plate 300 is decreased, a spacing distance between the LEDs is increased. Accordingly, the size of a dark region of the light-guide plate 300 corresponding to a portion between the LEDs may be increased.

The size of the dark region may decrease when the light passing through the second control pattern 366 spreads out in the second beam angle θ2 larger than the first beam angle θ1. The light passing through the first control pattern 362 spreads out in the first beam angle θ1. In addition, a display area DA displaying an image may be broadened by the second control pattern 366. That is, a surrounding area EA may be decreased since light passing through the second control pattern 366 spreads out in a large angle. The image is not displayed in the surrounding area EA, and the surrounding area EA surrounds the display area DA. For example, a portion of the surrounding area EA may be decreased by the second control pattern 366. The portion of the surrounding area EA corresponds to a portion of the emissive surface 330, through which light is not emitted and is close to the incident surface 310.

In a conventional art, a ratio a/w is has been in a range of about 0.3 to about 0.4 when the distance between the LEDs 210 is referred to as 'w' and a width of the surrounding area EA corresponding to the portion of the emissive surface 330, from which the light is not emitted, is referred to as 'a'.

However, when the backlight assembly employs two LEDs 210, the ratio 'a/w' is about 0.25 smaller than 0.3 since the distance 'w' between the LEDs 210 increases. Therefore, the width 'a' increases so that the ratio 'a/w' is in the range of about 0.3 to about 0.4. As a result, an area of the display area DA decreases. According to an embodiment of the present invention, the second control pattern 366 of the light-control pattern unit 360 diffuses light so that the light incident into the second control pattern 366 is guided toward a portion of the emissive surface 330 adjacent to the incident surface 310.

Accordingly, an embodiment of the present invention may decrease the dark region without decreasing the area of the display area DA.

The first control pattern 362 includes at least two inclined surfaces 363. The light passing through the first control pattern 362 is diffused at the first beam angle θ1 by the two inclined surfaces 363. The first beam angle θ1 is maximized when an angle between the two inclined surfaces 363 is about 45°. The first beam angle θ1 may be decreased as the angle between the two inclined surfaces 363 is increased to an angle larger than about 45° or is decreased to an angle smaller than about 45°.

In an exemplary embodiment of the present invention, edges of the two inclined surfaces 363 may make contact with each other so that the first control pattern 363 may have a jagged shape. The edges of the two inclined surfaces 363 may make contact at an angle to each other. Alternatively, the edges of the two inclined surfaces 363 may roundly contact with each other. The beam angle at an apex 364 of the first control pattern 362, at which the edges of the two inclined surfaces 363 contact with each other, may be larger than the beam angle at an apex of the first control pattern 362 when the edges of the two inclined surfaces 363 roundly contact with each other. Alternatively, the two inclined surfaces 363 may include protrusions roundly protruding from the two inclined surfaces 363 so that the first beam angle θ1 may increase.

The first control pattern 362 may include patterns connected to one another. Alternatively, the first control pattern 362 may include patterns spaced apart from one another by a predetermined distance. When the first control pattern 362 includes patterns spaced apart from one another, a portion of the light-guide plate 300 between the patterns on the incident surface 310 transmits light generated from the LEDs and the light is emitted from the emissive surface 330 of the light-guide plate 300. Accordingly, in a light-guide plate having a large size, the efficiency of light may be improved and processing properties of the light-guide plate 300 may be improved when the first control pattern 362 includes the patterns spaced apart from one another.

The first control pattern 362 may include patterns having a trapezoidal shape. The first control pattern 362 including the patterns having the trapezoidal shape diffuses light in a first beam angle θ1. The first beam angle θ1 may be substantially the same as the beam angle in which the first control pattern 362 including the patterns having a prism shape and being spaced apart from one another diffuses.

The second control pattern 366 includes a curved surface 367 to diffuse light in a second beam angle θ2 which is larger than the first beam angle θ1. For example, the second control pattern 366 may include patterns having a semi-elliptical cross-section. The second beam angle θ2 may increase as an angle between a major axis of the semi-elliptical cross-section and a width direction of the incident surface decreases when the second control pattern 366 includes the patterns having the semi-elliptical cross-section. Thus, the major axis of the semi-elliptical cross-section may be substantially parallel to the width direction of the incident surface.

However, a display apparatus including the backlight assembly 100 may require a relatively narrow second beam angle θ2. When the major axis of the semi-elliptical cross-section is substantially perpendicular to the width direction of the incident surface 310, the second beam angle θ2 may decrease. In an exemplary embodiment of the present invention, the second control pattern 366 may include patterns having a semi-elliptical cross-section having a major axis substantially inclined by an acute angle with respect to the width direction of the incident surface 310 so that the backlight assembly 100 spreads out light in the narrow second angle θ2. In another exemplary embodiment of the present invention, the second control pattern 366 may include patterns having a hemispherical shape.

The second control pattern 366 may have the same height as the first control pattern 362. Alternatively, the second control pattern 366 may have a height smaller than that of the first control pattern 362 so that a difference between the first beam angle θ1 and the second beam angle θ2 may decrease. Alternatively, the second control pattern 366 may have a height larger than that of the first control pattern 362 so that a difference between the first beam angle θ1 and the second beam angle θ2 may increase.

Figure 5:
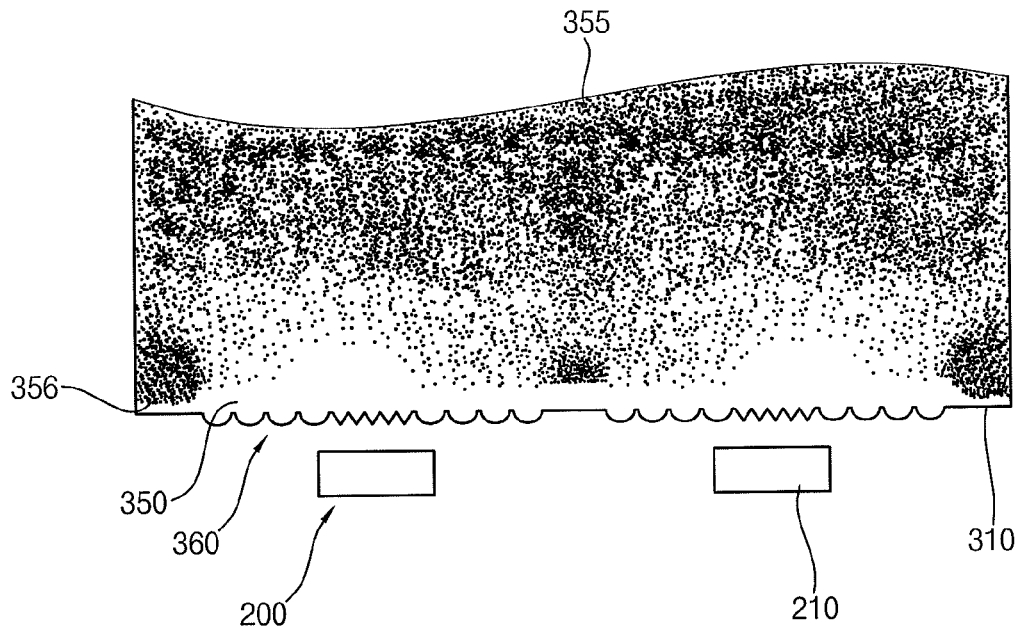
FIG. 5 is a plan view illustrating a reflective surface of the light-guide plate shown in FIG. 1.

FIG. 5 is a plan view illustrating a reflective surface of the light-guide plate shown in FIG. 1.

Referring to FIG. 1 and FIG. 5, reflective patterns 355 are formed at the reflective surface 350.

The reflective patterns 355 disperse and reflect light incident into the light-guide plate 300 so that the light is emitted from the emissive surface 330. An amount of the light emitted from the emissive surface 330 may increase as the reflective patterns 355 are more densely formed at the reflective surface 350.

Light incident into the incident surface 310 diffused by a portion of the light-guide plate adjacent to the incident surface. Thus, the reflective patterns 355 are formed at a region of the reflective surface spaced apart from the incident surface 310 by a predetermined distance.

The reflective patterns 355 may be more densely formed at the reflective surface 350 as a distance from the incident surface 310 increases, so that the light is uniformly emitted through the emissive surface 330. Alternatively, the reflective patterns 355 may be formed at a portion of the reflective surface 350 corresponding to both sides of the incident surface 310 which the light generated from the LED 210 does not reach. Alternatively, the reflective patterns 355 may be formed at a portion of the reflective surface 350 which is disposed between two LEDs 210 when the backlight assembly employs at least two LEDs.

In addition, the reflective surface 350 may further include sub-reflective patterns 356. The sub-reflective pattern 356 are formed at a portion of the reflective surface 350 which is disposed between the incident surface 310 and the reflective patterns 355, and corresponds to opposite sides of the incident surface 310 since the light passing through incident surface 310 does not directly reach the portion of the light-guide plate 300 at which the sub-reflective patterns 350 is formed due to directional properties of the light generated from the LED 210.

As mentioned above, a density of the reflective patterns 355 formed at the reflective surface 350 varies according to a position of the reflective surface 350 so that the emissive surface 330 emits light that is substantially uniform.

Figure 6:
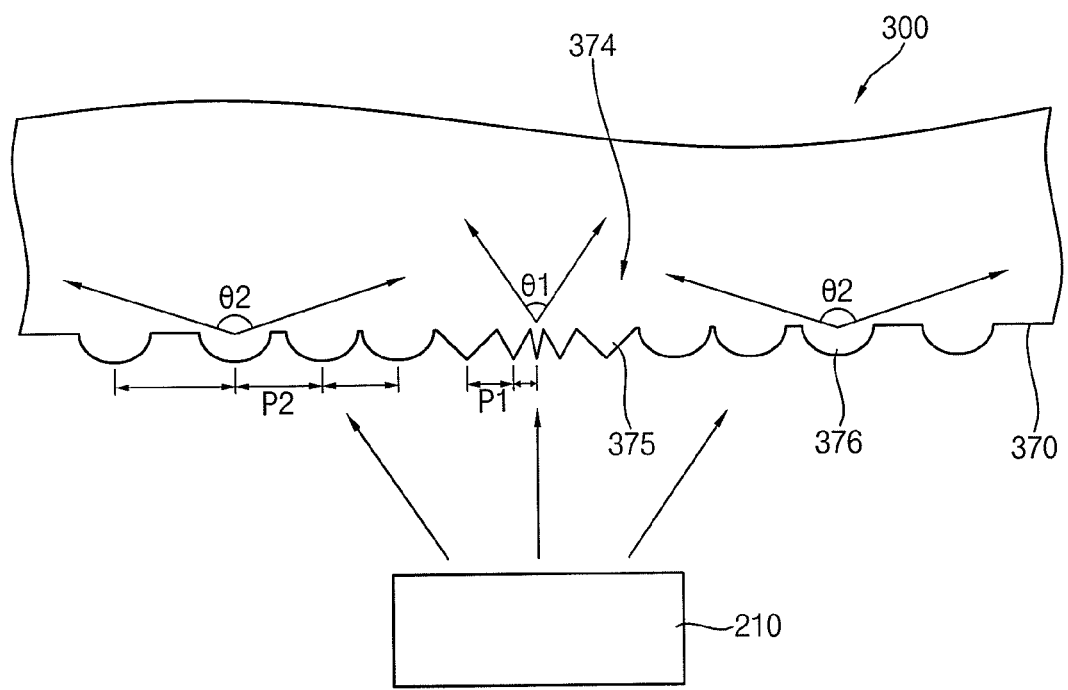
FIG. 6 is an enlarged plan view illustrating another exemplary embodiment of the light-control pattern unit shown in FIG. 2.

FIG. 6 is an enlarged plan view illustrating another exemplary embodiment of the light-control pattern unit shown in FIG. 2.

Referring to FIG. 2 and FIG. 6, a light-control pattern unit 374 includes first control patterns 375 and second control patterns 376. A pitch P1 of the first control patterns 375 increases as a distance from the center of an LED 210 increases. Thus, light passing through the first control patterns 376 is diffused at different first beam angles θ1 in accordance with a position of the first control patterns 376. For example, the first beam angle θ1 may increase as a distance from the center of the first control patterns 375 increases.

The first control pattern 375 may include first patterns having shapes different from one another. The shapes may be continuously changed according to the pitches P1. Alternatively, the first control pattern 375 may include first patterns having a same shape, but the pitches P1 of the first patterns may be different from one another.

The first beam angles θ1 increases as a distance from the center of the first patterns increases. For example, the light generated from the LED 210 is manipulated to diffuse in the first beam angles θ1. The first beam angle θ1 varies according to an angle between a path of a ray of the light and the incident surface 310, so that the efficiency of the light generated from the LED may be improved.

The second control pattern 376 includes second patterns. A pitch of the second control pattern 376 increases as a distance from the first control pattern 375 increases. For example, the light generated from the LED 210 is manipulated to diffuse in second beam angles θ2. The second beam angle θ2 varies according to an angle between a path of a ray of the light and the incident surface 310. For example, the second beam angle θ2 increase as the distance from the incident surface 310 increases. The second control pattern 376 may include second patterns having shapes different from one another. The shapes of the second patterns may be continuously changed according to the pitches P2. Alternatively, the second control pattern 376 may include second patterns having a same shape, but the pitches P2 of the second patterns are different from one another.

The light-control pattern 374 diffuses light inclined with respect to the incident surface 370 so that the diffused light is emitted from a portion of the emissive surface 330 adjacent to a side of the light-control pattern 374. Therefore, the light-control pattern 374 may prevent the dark region from being formed in a region corresponding to opposite sides of the LED 210.

The second control pattern 376 may reduce the width 'a' of the surrounding area EA shown in FIG. 4. In addition, the second control pattern 376 may substantially prevent the dark region from being formed when the backlight assembly 100 employs at least two LEDs 210.

Figure 7:
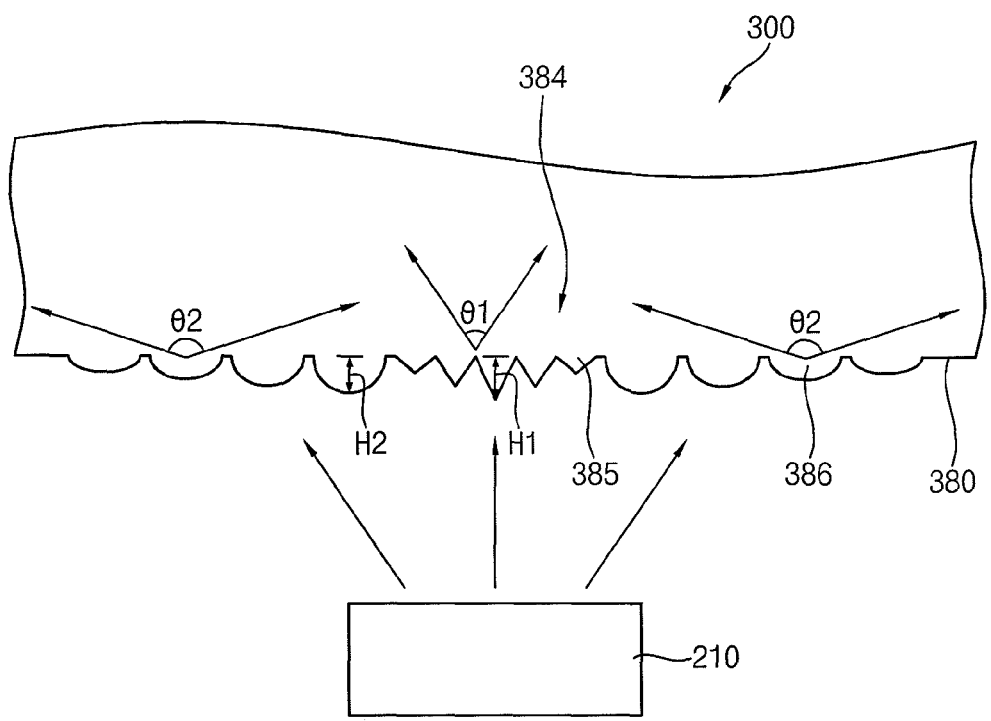
FIG. 7 is an enlarged plan view illustrating still another exemplary embodiment of the light-control pattern unit shown in FIG. 2.

FIG. 7 is an enlarged plan view illustrating another exemplary embodiment of the light-control pattern unit shown in FIG. 2.

Referring to FIG. 2 and FIG. 7, a light-control pattern unit 384 includes a first control pattern 385 and a second control pattern 386. The first control pattern 385 includes first patterns and the second control pattern 386 includes second patterns. A first height H1 of each of the first patterns decreases as a distance from the center of the first control pattern 385 increases so that the first beam angles θ1 increases as the distance from the center of the first patterns 385 increases.

A second height H2 of each of the second patterns decreases as the distance from the center of the first control pattern 385 increases so that the second beam angles θ2 increases as the distance from the center of the first patterns 385 increases.

A portion of the light generated from the LED may not reach the incident surface 380 when the second height H2 decreases as the distance from the center of the first control pattern 385 increases. Thus, the incident surface 380 may be processed to compensate differences between the second heights. Therefore, substantially all of the light generated from the LED may reach the incident surface.

In addition, differences between the first heights H1 may be compensated by a method substantially the same as or similar to the above mentioned method of compensating the differences between the second heights H2.

Figure 8:
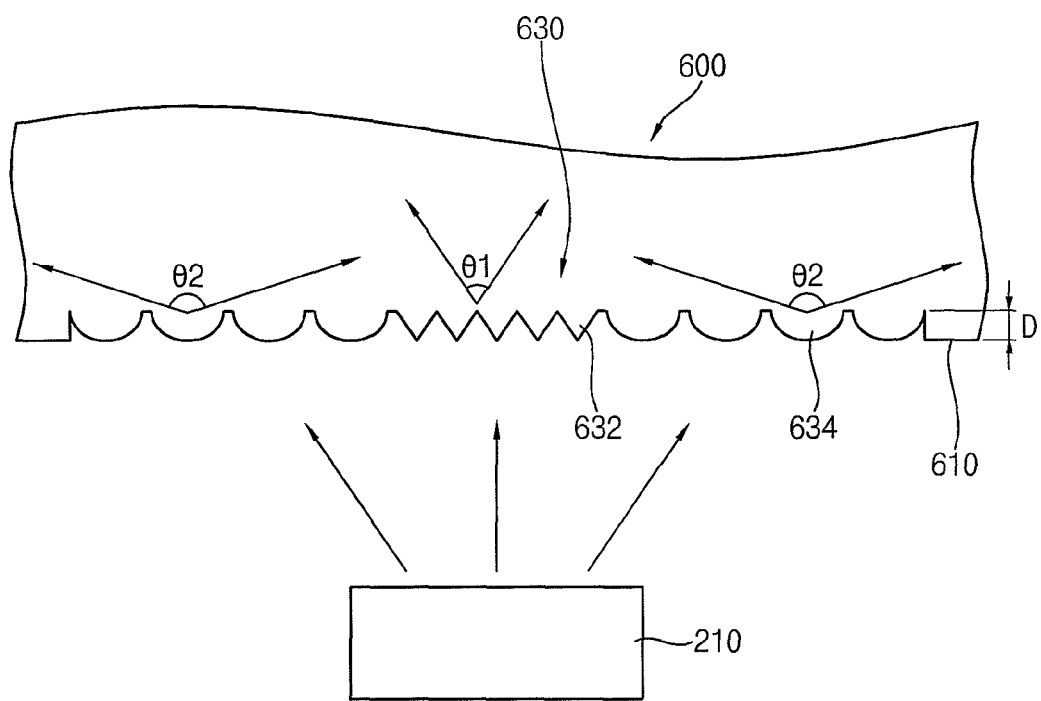
FIG. 8 is an enlarged plan view illustrating a light-control pattern unit of a backlight assembly according to another exemplary embodiment of the present invention.

FIG. 8 is an enlarged plan view illustrating a light-control pattern unit of a backlight assembly according to another exemplary embodiment of the present invention.

Referring to FIGS. 1 and 8, light-control pattern units 630 formed on an incident surface 610 of a light-guide plate 600 protrude from a surface portion that is recessed in comparison with an edge portion of the incident surface 610.

The incident surface 610 includes the edge portion and the surface portion that is recessed in comparison with the edge portion by a depth D substantially the same as a height of the light-control pattern units 630. In another exemplary embodiment of the present invention, the surface portion may be recessed in comparison with the edge portion by a depth D larger than the height of the light-control pattern units 630.

The size of the light-guide plate 600 may be substantially reduced by the height of the light-control pattern unit when the incident surface includes the edge portion and the surface portion that is recessed in comparison with the edge portion. The surface portion may include a concave surface.

An area of a display region displaying an image may be reduced when the incident surface 610 includes the edge portion and the surface that is recessed in comparison with the edge portion. Therefore, the light-guide plate according to the exemplary embodiment of the present invention may be employed in a backlight assembly that is employed in a large display apparatus.

Figure 9:
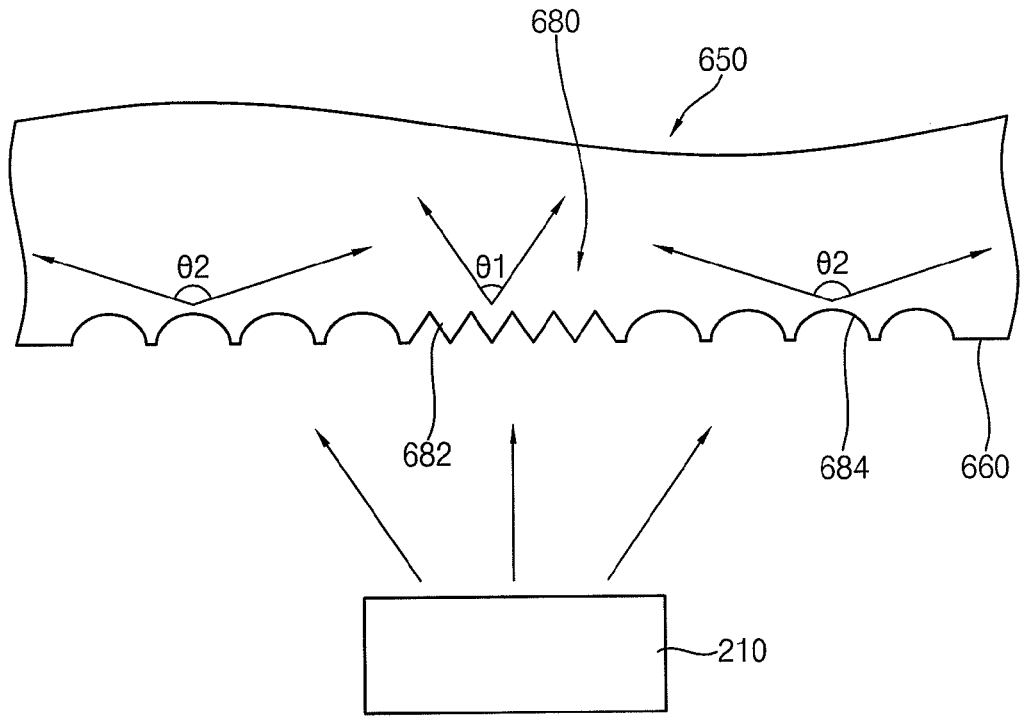
FIG. 9 is an enlarged plan view illustrating a light-control pattern unit of a backlight assembly according to still another exemplary embodiment of the present invention.

FIG. 9 is an enlarged plan view illustrating a light-control pattern unit of a backlight assembly according to another exemplary embodiment of the present invention.

Referring to FIGS. 1 and 9, a light-control pattern unit 680 formed at an incident surface 660 of a light-guide plate 650 includes a first control pattern 682 and a second control pattern 684. The first and second control patterns 682 and 684 are concave with respect to the incident surface 660.

In the present exemplary embodiment, the light-control pattern unit 680 increases the size of the backlight assembly 100. The feature is substantially the same as or similar to a feature of the exemplary embodiment illustrated referring to FIG. 8. The first and second control patterns 682 and 684 have a concave shape. The feature is substantially the same as or similar to a feature of exemplary embodiments illustrated referring to FIG. 3, FIG. 6 and FIG. 7. Thus, any further repetitive explanation will be omitted.

The light-control pattern unit 680 may be formed by a mold for manufacturing the light-guide plate as illustrated above. Alternatively, the light-control pattern unit 680 may be formed by a special device different from the mold for manufacturing the light-guide plate.

Figure 10:
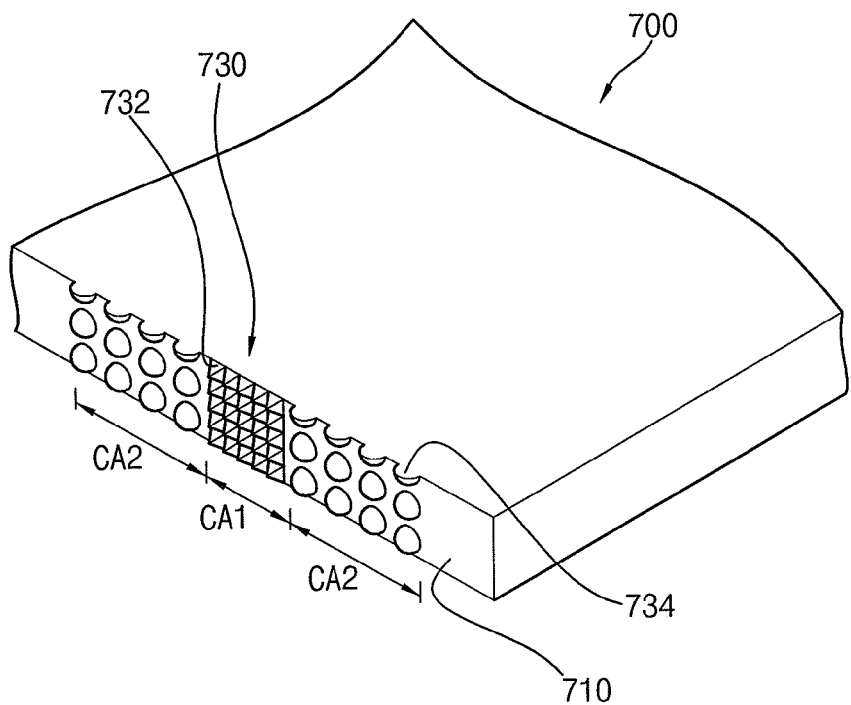
FIG. 10 is a perspective view illustrating a backlight assembly according to another exemplary embodiment of the present invention.

FIG. 10 is a perspective view illustrating a backlight assembly according to another exemplary embodiment of the present invention.

Referring to FIGS. 1 and 10, a light-control pattern unit 730 formed at an incident surface 710 of a light-guide plate 700 includes first control patterns 732 and second control patterns 734. The first control patterns 732 have the shape of a quadrangular pyramid. The second control patterns 734 have an oval shape.

The first control patterns 732 are arranged in a matrix shape in a first region CA1 of the incident surface 710. The first control patterns 732 adjacent to each other may make contact with each other. In another exemplary embodiment of the present invention, the first control patterns 732 adjacent to each other may be spaced apart from each other when the light-guide plate 700 has a relatively large size. In further another exemplary embodiment of the present invention, the first control pattern 732 may have the shape of a triangular pyramid.

The second control patterns 734 may be arranged in a shape substantially the same as or similar to that of the first control patterns 732 in the second region CA2 of the incident surface 710. The second control patterns 734 may have a hemisphere shape. Alternatively, the second control patterns 734 may have a bead shape. In another exemplary embodiment of the present invention, the second control pattern 734 may be formed in an inner portion of the light-guide plate 700 adjacent to the incident surface 710. For example, the second control pattern 734 may include a hole formed in the inner portion of the light-guide plate 700 adjacent to the incident surface 710.

The first and second control patterns 732 and 734 may have a convex shape with respect to the incident surface 710. Alternatively, the first and second control patterns 732 and 734 may have a concave shape with respect to the incident surface 710.

Figure 11:
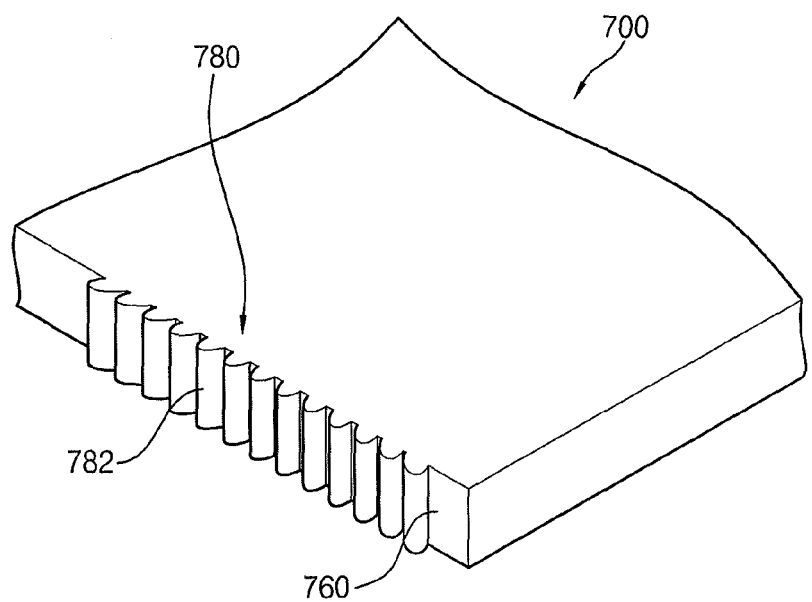
FIG. 11 is a perspective view illustrating a backlight assembly according to still another exemplary embodiment of the present invention.
Figure 12:
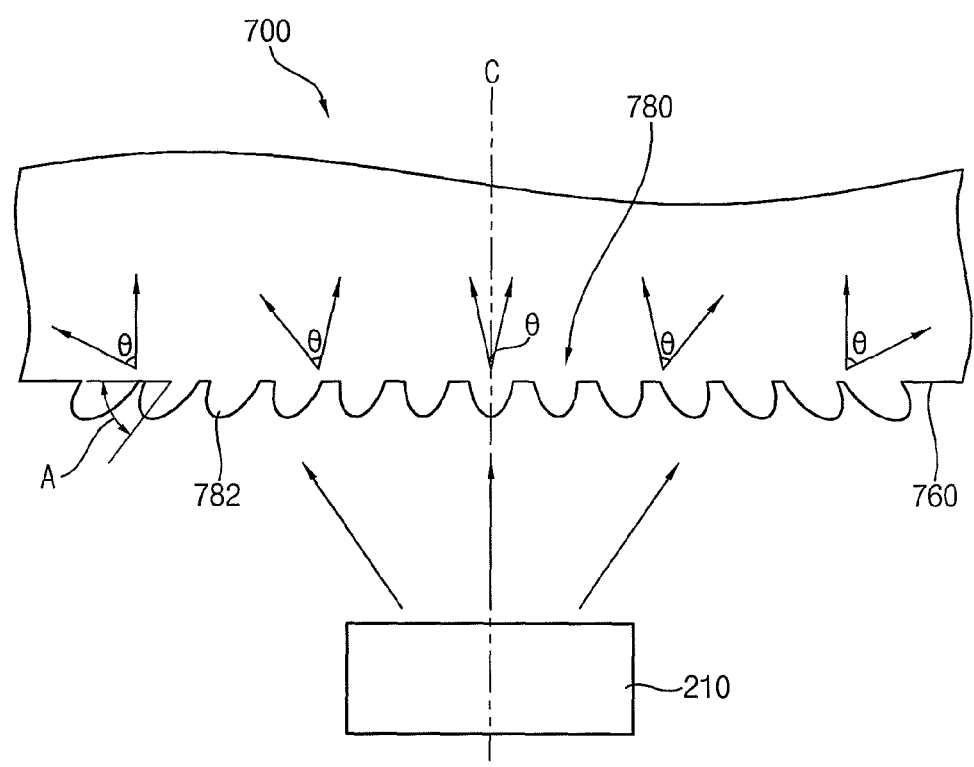
FIG. 12 is an enlarged plan view illustrating the light-control pattern unit shown in FIG. 11.

FIG. 11 is a perspective view illustrating a backlight assembly according to another exemplary embodiment of the present invention. FIG. 12 is an enlarged plan view illustrating the light-control pattern unit shown in FIG. 11.

Referring to FIGS. 1, 11 and 12, a light-guide plate 700 includes a light-control pattern unit 780 formed at the incident surface 760 that may include patterns 782 protruding from the incident surface. The protruding patterns 782 are extended in one direction.

The beam angle θ increases as a distance from a central portion of the incident surface 760 corresponding to the center of the LED 210 increases due to the protruding patterns 782.

An angle 'A' between the protruding pattern 782 and the incident surface 760 decreases as the distance from the central portion 'C' of the incident surface 760 increases. Therefore, the beam angle θ may be controlled by reflection of light according to the extension of the protruding patterns 782 and the angle A between the protruding pattern 782 and the incident surface 760.

The beam angle θ varies according to a curvature of a surface receiving the light. For example, the beam angle θ is relatively small when the light is incident to a position having a large curvature, such as a position near the central portion C, and the beam angle θ is relatively large when the light is incident to a portion having a small curvature, such as a portion largely spaced apart from the central portion C.

The protruding patterns 782 may have a cross-section of an oval shape. The protruding patterns 782 are inclined to the incident surface 760 by the angle A between a major axis of the oval shape and the incident surface 760.

An exterior surface of each of the protruding patterns 782 has a varying curvature according to a position thereof. The curvature of the exterior surface of each of the protruding patterns 782 decreases as a distance from a line at which the exterior surface meets the major axis of the oval shape increases. The curvature of the exterior surface to which the light generated from the LED 210 is incident decreases as the distance from the central portion of the incident surface increases, because the angle between one of the protruding patterns 782 and the incident surface decreases as the distance from the central portion C of the incident surface increases. Therefore, the beam angle θ increases as the distance from the central portion C of the incident surface increases. In another exemplary embodiment of the present invention, the protruding patterns 782 may have a cross-section of a polygon.

The protruding patterns 782 may reduce a length of a path of the light entered into the light-guide plate 700 to improve the efficiency of the light since the beam angle θ increases as the distance from the central portion C increases.

In addition, the light is emitted through a portion of the emissive surface 330 near to the incident surface to reduce the dark region since the beam angle θ increases as the distance from the central portion C increases.

A pitch of the protruding patterns 782 may increase as the distance from the central portion C so that a ratio in which the beam angle θ increases becomes larger. The height of the protruding patterns 782 may decrease as the distance from the central portion C increases so that the ratio becomes larger.

The protruding patterns 782 may be convex. Alternatively, the protruding patterns 782 may be concave.

Figure 13:
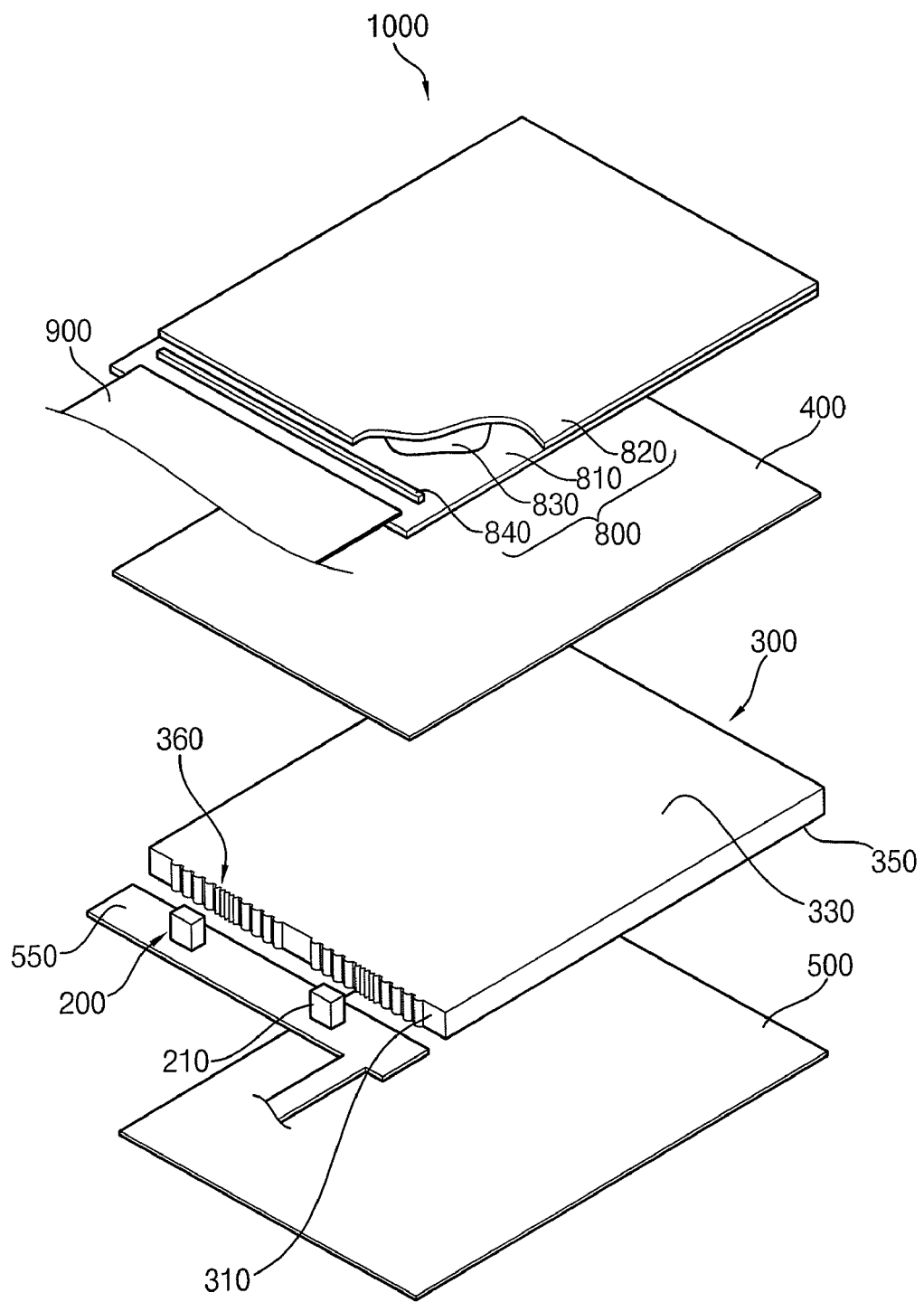
FIG. 13 is an exploded perspective view illustrating a display apparatus according to an exemplary embodiment of the present invention.

FIG. 13 is an exploded perspective view illustrating a display apparatus according to an exemplary embodiment of the present invention.

In the present exemplary embodiment, a light-guide plate and an optical sheet may have a structure substantially the same as or substantially similar to one of examples illustrated referring to FIGS. 1 to 11. Thus, any further repetitive explanation concerning the light-guide plate and the optical sheet will be omitted.

Referring to FIG. 13, a display apparatus 1000 according to an exemplary embodiment of the present invention includes a light source 200 with light-emitting diodes (LED) 210, a light-guide plate 300 with an incident surface 310, an emissive surface 330 and a reflective surface 350, and a light-control pattern unit 360, an optical sheet 400, a reflective sheet 500 with a light source driving film 550, and a display panel 800.

The display panel 800 displays an image using light generated from the light source 200. The display panel 800 includes a first substrate 810, a second substrate 820 opposite to the first substrate 810, and a liquid crystal layer 830 interposed between the first substrate 810 and the second substrate 820. The first substrate 810 may include a thin-film transistor (TFT) substrate having a TFT, which is a switching element, formed in a matrix shape. The second substrate 820 may include a color filter substrate having RGB color filters to display colors.

The display panel 800 may further include a driving chip 840 disposed on the first substrate 810. The driving chip 840 applies a control signal to the first and second substrates 810 and 820.

The display apparatus 1000 may further include a panel driving film 900. The panel driving film 900 is electrically connected to an exterior device (not shown) and the driving chip 840 to apply driving signals received from the exterior device to the driving chip.

According to the light-guide plate, the backlight assembly and display apparatus having the light-guide plate, an incident surface of the light-guide plate has a plurality of regions divided according to a position of an LED and a plurality of control patterns having shapes different from one another is formed in the regions respectively. Therefore, a beam angle may increase as the distance from a central portion corresponding to the LED increases.

As a result, a dark region, which is formed at both side portions of an emissive surface adjacent to the incident surface, may be reduced. In addition, the efficiency of light may be improved since a light-control pattern reduces the length of the path of the light in the light-guide plate.

Having described the exemplary embodiments of the present invention and their features, it is noted that various changes, substitutions and alterations can be made herein without departing from the spirit and scope of the invention as defined by appended claims.

What is claimed is:

1. A light-guide plate comprising:
    an incident surface including a plurality of light-control patterns formed in regions of the incident surface, the light-control patterns having different shapes from one another according to the regions corresponding to a position of a light source;
    an emissive surface extended from a side of the incident surface; and
    a reflective surface opposite to the emissive surface,
    wherein the light-control patterns includes a first control pattern having at least two inclined surfaces and a second control pattern having a semi-elliptical cross-section, and
    wherein the second control pattern includes a plurality of second patterns, and a height of each of the second patterns decreases as a distance from a first region in which the first control pattern is formed increases.

2. The light-guide plate of claim 1, wherein
    the first control pattern is formed in a first region of the regions corresponding to a central portion of the light source;
    the second control pattern is formed in a second region adjacent to a side of the first region, and
    wherein light passing through the first control pattern has a first beam angle and light passing through the second control pattern has a second beam angle larger than the first beam angle.

3. The light-guide plate of claim 2, wherein the first control pattern includes a plurality of first patterns, each of the first patterns having a triangular cross-section.

4. The light-guide plate of claim 3, wherein a pitch of the first patterns increases as a distance from a central portion of the light source increases.

5. The light-guide plate of claim 3, wherein a height of the first patterns decreases as a distance from a central portion of the light source increases.

6. The light-guide plate of claim 2, wherein the first control pattern includes a plurality of first patterns, each of the first patterns having the shape of a pyramid.

7. The light-guide plate of claim 2, wherein each of the second patterns has an oval-shaped cross-section.

8. The light-guide plate of claim 7, wherein a pitch of each of the second patterns increases as a distance from a central portion of the light source increases.

9. The light-guide plate of claim 1, wherein the light-control pattern comprises protruding patterns to increase a beam angle of light passing through the incident surface as a distance from a central portion of the light source increases.

10. The light-guide plate of claim 9, wherein the protruding patterns have an oval-shaped cross-section, and an angle between a long axis of the oval and the incident surface decreases as the central portion of the light source increases.

11. The light-guide plate of claim 1, wherein the light-control patterns comprises convex patterns protruding from the incident surface.

12. The light-guide plate of claim 1, wherein the incident surface comprises:
    an edge portion; and
    a surface portion surrounded by the edge portion and that is recessed with respect to the edge portion, the light-control patterns protruding from the surface portion.

13. The light-guide plate of claim 1, wherein the light-control patterns comprises concave patterns that are recessed with respect to the incident surface.

14. The light-guide plate of claim 1, wherein the reflective surface comprises reflective patterns to scatter light from the light source.

15. The light-guide plate of claim 14, wherein the reflective patterns are formed in a first region of the reflective surface spaced apart from the incident surface and a density of the reflective patterns increases as a distance from the incident surface increases.

16. The light-guide plate of claim 15, wherein the reflective surface further comprises sub-reflective patterns formed in a second region of the reflective surface, and the second region is disposed between both side portions of the incident surface and the first region.

17. A backlight assembly comprising:
    a light source generating light;
    a light-guide plate comprising:
        an incident surface including a plurality of light-control patterns formed in regions of the incident surface, the light-control patterns having different shapes from one another according to the regions corresponding to a position of a light source;
        a emissive surface extended from a side of the incident surface; and
        a reflective surface opposite to the emissive surface; and
    an optical sheet disposed on the emissive surface,
    wherein the light-control patterns includes a first control pattern having at least two inclined surfaces and a second control pattern having a semi-elliptical cross-section, and
    wherein the second control pattern includes a plurality of second patterns, and a height of each of the second patterns decreases as a distance from a first region in which the first control pattern is formed increases.

18. The backlight assembly of claim 17, wherein the light source comprises at least two light-emitting diodes (LEDs).

19. The backlight assembly of claim 18, wherein
    the first control pattern is formed in a first region of the regions corresponding to a central portion of each of the LEDs;
    the second control pattern is formed in a second region adjacent to a side of the first region, and
    wherein the light passing through the first control pattern has a first beam angle and the light passing through the second control pattern has a second beam angle larger than the first beam angle.

20. The backlight assembly of claim 19, wherein the first control pattern includes a plurality of first patterns, each of the first patterns having a triangular cross-section and each of the second patterns has an oval-shaped cross-section.

21. The backlight assembly of claim 17, wherein the light-control patterns comprise protruding patterns having an oval-shaped cross-section and an angle between a major axis of the oval and the incident surface decreases as a distance from a central portion of the light source increases.

22. A display apparatus comprising:
    a backlight assembly comprising:
        a light source;
        a light-guide plate including:
            an incident surface including a plurality of light-control patterns formed in regions of the incident surface, the light-control patterns having different shapes from one another according to the regions corresponding to a position of a light source;
            a emissive surface extended from a side of the incident surface; and
            a reflective surface opposite to the emissive surface; and
        an optical sheet disposed on the emissive surface; and a display panel disposed on the optical sheet, the display panel displaying an image, wherein the light-control patterns includes a first control pattern having at least two inclined surfaces and a second control pattern having a semi-elliptical cross-section, and wherein the second control pattern includes a plurality of second patterns, and a height of each of the second patterns decreases as a distance from a first region in which the first control pattern is formed increases.

* * * * *